United States Patent Office 3,367,597
Patented Feb. 6, 1968

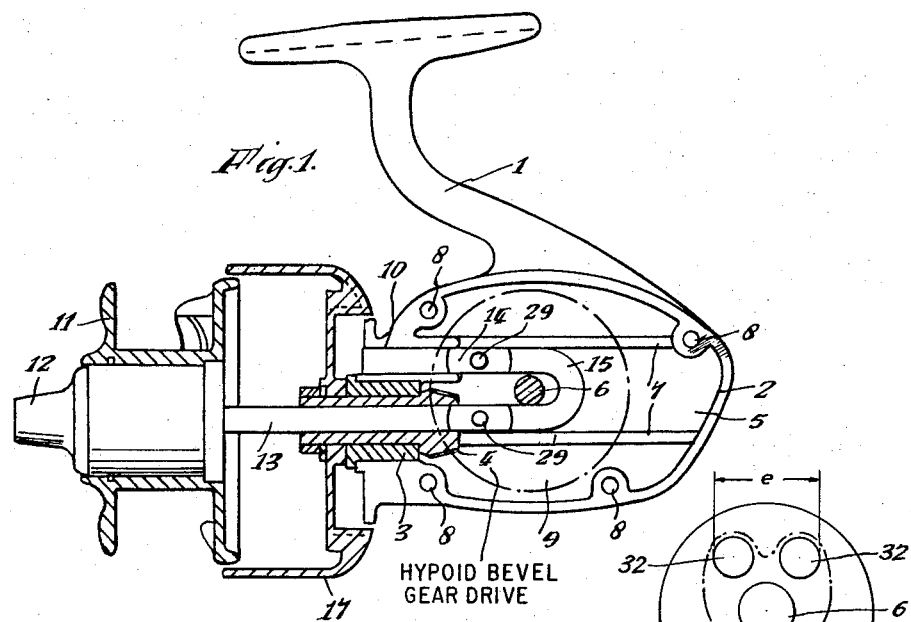
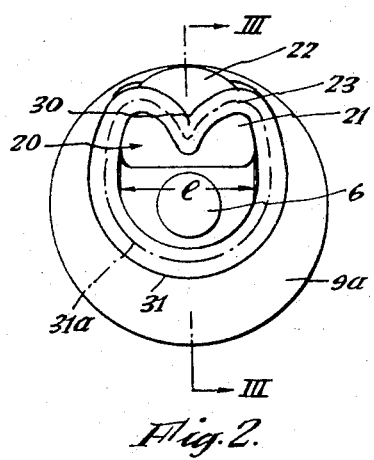
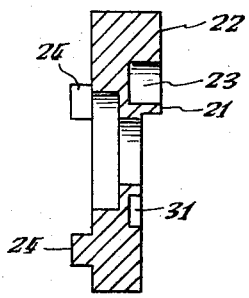
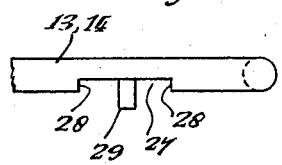
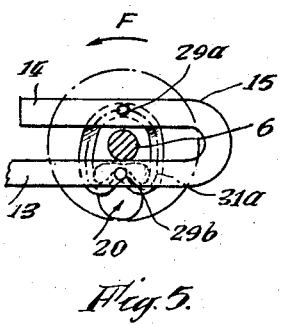
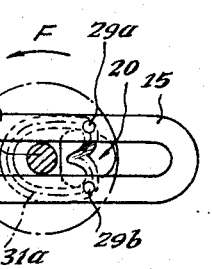

3,367,597
TRAVERSING DEVICES FOR SPINNING REELS
Kenneth Patrick Morritt, Cheam, England,
assignor to K. P. Morritt, Limited
Filed Nov. 25, 1964, Ser. No. 413,729
Claims priority, application Great Britain, Nov. 29, 1963, 47,243/63
6 Claims. (Cl. 242—84.21)

This invention relates to fishing reels, and has for its object to provide a cam mechanism suitable for incorporation in a fishing reel of the type where a line spool is reciprocated along its axis while fishing line is wound on to it from a rotating flier.

In such fishing reels it is advantageous to have a spool which is as wide as possible between its end plates and also that its barrel shall be of as large radius as possible, for regularity in casting, but these desired dimensions bring problems in ensuring a regular reciprocation, since in known cam mechanisms the throw available is usually only approximately only half of the radius of the crown wheel which drives the flier. Multiplication of this throw can only be achieved, with the use of known cam mechanisms, by complicated linkages, and it is an object of this invention to obviate this disadvantage.

It is a further object of the invention to provide a fishing reel of the non-rotating spool type in which the spool reciprocates along an axis which does not intersect with the axis of rotation of the crown wheel which drive the line pickup means. In this way, the shaft bearing the crown wheel may be extended through the plane perpendicular to its axis which contains the shaft bearing the spool, without limiting the throw available to the spool.

A particular embodiment of the invention will now be described with reference to the accompanying drawings wherein, FIG. 1 is a sectional face view of a reel incorporating a cam mechanism according to the invention.

FIG. 2 is a face view of a crown wheel for use as a drive wheel in the embodiment.

FIG. 3 is a section on the line III—III of FIG. 2.

FIGS. 4, 5 and 6 show in face view three positions of the crown wheel and reciprocable spool-carrying shaft during half a revolution of the crown wheel.

FIG. 7 is a side view of part of the reciprocating spool, carrying shaft.

FIG. 8 is a face view similar to FIG. 2 but of a second embodiment.

In FIG. 1 there is shown a fishing reel having a support arm 1 extending for attachment to the rod, and having at one end a casing 2. Mounted for rotation in a cylindrical bearing at 3 in one end of the casing 2 is an offset bevel conical gear 4, having a hollow cylindrical centre bore and being one member of a hypoid gear pair.

The casing 2 has a face wall 5 which provides at its centre a bearing for a shaft 6 of a rotatable crown wheel 9 which is the second member of the hypoid gear pair.

Ribs 7 extend between the ends of the wall 5 to act as guideways to the spool-carrying shaft which is shortly to be described. The casing 2 also has a second bearing 10 running parallel to the axis of the bearing 3. This bearing 10 provides a support and steadying bearing for a second leg of the spool-carrying shaft. It is to be understood, of course, that a counterpart casing is provided to enclose the casing 2 and protect the working parts which counterpart casing would be secured to screwed lugs 8.

A spool 11 is mounted by a usual securing means 12 to the end of one leg 13 of a U-shaped reciprocable spool-carrying shaft. The spool-carrying shaft comprises the leg 13 and a second leg 14 bent through a hairpin bend 15 to lie parallel to the leg 13. The inner radius of the hairpin bend 15 is equal to the radius of the shaft 6, and the distance between the mutually most distant parts of the legs, 13, 14 is such that those parts slidingly engage mutually inner surfaces of the ribs 7 in the casing 2 and its counterpart. The leg 13 also slidingly bears against and passes through the cylindrical bore in the centre of the bevel pinion 4, which is free to rotate about it. The free end of the leg 14 passes into the guide bearing 10, in which it is free to reciprocate axially.

The offset bevel pinion 4 is secured in the usual way to a flier drum 17, which is equipped with a pick-up finger. The bevel 4 meshes with teeth in a planar face of the crown wheel 9 such that the axes of rotation of the two wheels do not extend in the same plane and their lines do not intersect; these gears 4, 9 form a hypoid gear pair.

Hypoid gears are a pair of bevelled gears that are designed so that the axis of the pinion does not intersect the axis of the gear and have the teeth on the pinion cut spirally and the teeth on the gear cut non-radially.

In order to cause reciprocation of the spool 11 when the flier 17 is rotating to wind a fishing line onto it, a cam mechanism is provided on the crown wheel 9 and on the legs 13 and 14 of the spool-carrying shaft. This cam arrangement will now be described with particular reference to FIGS. 2 to 7 in the drawings.

An insert 9a is provided with a stud 20 projecting from its surface. The stud is symmetrical about a line radial from the axis of rotation 6 of the wheel 9, and comprises two parts, an inner, 21, and an outer, 22, which between them define a channel 23. The walls of the channel 23 and the circumferential outer surfaces of the stud 20 all provide cam surfaces. On the other face of the insert 9a there are provided three equidistantly spaced support and locking lugs 24 which secure the insert fast with the crown wheel 9, which is relieved in its face to accommodate the insert.

Cam follower means provided in each of the legs 13, 14 comprise a recess 27 with walls perpendicular to its base equal in all dimensions in each leg and situated equidistantly from the bend 15 in each leg. The distance between the vertical end walls 28 of the recess 27 is equal to the distance e in FIG. 2 and a cam following pin 29 is provided in each recess 27 midway between the walls 28. The pin 29 is inset into the leg at the floor of the recess 27 and projects, as best seen in FIG. 7 to beyond the edge line of the leg 13. An identical pin 29 is provided in the leg 14. The pins 29 are circular in cross section and are of a diameter to slidably abut against and engage each cam surface defined by the walls of the channel 23.

The operation of the cam mechanism will now be described with reference to the three relative positions shown in FIGS. 4, 5 and 6, the wheel 9 being taken as rotating in the sense of the arrow F in those figures.

At the position shown in FIGURE 4 the pin 29a has just left one end of the channel 23 and positions the legs 13, 14 for the pin 29b on the legs 13, just about to enter the channel. On rotation of the crown wheel 9, the pin 29b slides against the walls of the channel 23 and draws the legs 13 and 14 to the right, in the figure. The shape of the channel 23 is as shown in FIGURE 2 and is such that the velocity of linear movement of the spool-carrying legs 13 and 14 is constant throughout the half cycle of rotation of the wheel 9 and is then reversed almost instantaneously, resuming at the same velocity.

When the pin 29b approaches the position shown in FIGURE 5 it approaches the region of the channel 23 denoted 30 in FIGURE 2. It can be seen that there is a gap across the root of the V-shape in the channel, tangentially of the radial line of symmetry of the stud 20, which gap is of greater width than the follower 29 which is about to pass through it, and at this point, if additional means were not provided, there would be a rock in the movement of the follower, with a consequent delay and possible build-up of line on the spool. To overcome this the outer surfaces, particularly of the inner stud portion 21 are shaped to be cam surfaces, and as can be seen from FIGURES 4, 5 and 6 bear against the walls 28 of the recesses 27 in a manner which complements the action of the follower pins 29.

When the pin 29b reaches the region 30 of the channel 23, therefore, the cam surface walls of the stud 21 are abutting the walls 28 of the recess 27 and carry the leg 13 smoothly over the partial dwell which would otherwise occur.

As the position shown in FIGURE 6 the pin 29b is just leaving the channel and the pin 29a entering it, and the half cycle will be repeated with the legs 13, 14 moving in the opposite linear direction. The peripheral outer surfaces of the stud 20 assist this transition also.

The path which the pins follow is seen traced out at 31a, FIGURES 2 and 4. It can be seen that the throw obtained by this arrangement is between two positions of the cam follower means on the legs 13, 14 which are each side of, and equidistantly from the axis of rotation of the rotatable member on which the cam means are provided. In the present case this is almost the whole radius of the untoothed portion of the crown wheel (compare FIGS. 4 and 6). Smoothness of action, constant velocity and swift reverse have also been obtained. The throw is such that the recess 27 enters the bore of the bevel 4 at the position shown in FIGURE 4.

It is envisaged that the insert designated 9a may be made of nylon and inset into the centre of a metal crown wheel, but the crown wheel may be made all metal with a machined stud projection. A recessed cam track 31 is provided for guidance of the pin 29.

In a modified embodiment of the invention the pin 29 is integral with the material of the legs 13, 14, recesses corresponding to the recess 27 being machined out of the material of the legs each side of the pin.

In a further modified embodiment of the invention, part of which is shown in face veiw in FIGURE 8, no recessed cam track 31 is provided in the face of the crown wheel 9 or insert. An insert of this form is shown at 9b, FIGURE 8. The outer part 22 of the stud on the insert or crown wheel is omitted, it being found that two pins 32, cylindrical in form, corresponding to those two portions of the inner stud 21 which are joined by the narrow neck, suffice to guide the pin 29 and the walls of the recess 27 of the legs without the assistance of the cam track: the path followed by the pin 29 is shown by dotted line 33.

In this case the reciprocation of the spool 11 includes a slight pause at the inner and outermost limits of that movement and the movement of the spool between those two positions of reciprocation is not quite at constant speed, but the greater simplicity of the construction described in this modified form is advantageous when manufacturing costs are of importance.

It is also envisaged that a similar cam movement may be coupled from a stud on the face of an edge-tooth helical drive wheel (with associated cam followers) to a spool-carrying shaft slidable in the central bore of a worm engaging the drive wheel and rotating the flier.

A reduction gearing may be interposed between the drive wheel and the rotatable member driven by it.

What I claim and desire to secure by Letters Patent is:

1. A fishing reel having a U-shaped spool mounting shaft, a spool mounted on the spool mounting shaft, a flier drum, a casing, two elongate apertures in the casing extending parallel to each other, a gear fast with the flier drum and bearing in one of said apertures to be rotatable about one leg of the U-shaped spool mounting shaft, the other aperture slidably receiving the other leg of the U-shaped spool mounting shaft, drive means fast with each of the legs of the spool mounting shaft, drive means on a rotatable member, an axis of rotation for the rotatable member on a line midway between the axes of the elongation of the apertures, a rotatable drive wheel meshing with the gear fast with the flier drum, the rotatable member being rotated by rotation of the drive wheel, the drive means on the legs of the spool mounting shaft and the drive means on the rotatable member being in abutting engagement to drive the shaft in reciprocating movement upon rotation of the rotatable member.

2. A fishing reel according to claim 1 wherein the rotatable member is an insert in the drive wheel fast with the drive wheel.

3. A fishing reel according to claim 1 wherein the means on the rotatable member comprise an insert, a stud on the insert, a cam track recessed in the insert, the means on the spool mounting shaft comprising a recess in each leg of the spool mounting shaft defining walls of the recess, a pin projecting out of the base of each recess mid-way between the walls, the pin on each leg and the track in the insert being in interabutting engagement, the stud being in interabutting engagement at any one time with the walls of the recess in one leg.

4. A fishing reel having a spool mounting shaft, a spool mounted to the shaft, pick-up means for winding line onto the spool, a casing, means supporting the spool mounting shaft in the casing for axial reciprocating movement relative to the casing, the pick-up means being rotatable about an axis of rotation, a hypoid gear pair, a first gear of the hypoid gear pair fast with the rotatable pick-up means, a rotatable second gear of the hypoid gear pair meshing with the first, the axis of rotation of the pick-up means being within the spool mounting shaft, a rotatable member having an axis of rotation, drive means on the rotatable member eccentric of its axis of rotation for travel in a circular path when the rotatable member rotates, the rotatable member rotating upon rotation of the second gear of the hypoid gear pair, two drive elements fast with the spool mounting shaft, the two said drive elements being equidistantly spaced on opposite sides of a line through the axis of rotation of said rotatable member and parallel to the axis of rotation of the pick-up means, the axis of the first gear of the hypoid gear pair passing through one of said drive elements, said drive means on the rotatable member and at least one of the drive elements on the spool mounting shaft being in continuously interabutting engagement during the movement of the drive means in its circular path whereby the drive elements on the shaft are driven by drive means to and between limit positions equidistant from and at each side of the axis of rotation of the rotatable member taken in the direction of the axis of rotation of the pick-up means.

5. A fishing reel according to claim 4 wherein the spool mounting shaft is a U-shaped member, the U-shaped member having one leg, another leg parallel to the first and an arcuate portion joining the two legs, the arcuate portion passing round the axis of rotation of the rotatable member and the two drive elements fast with the spool mounting shaft being formed one in each leg of the shaft at an equal distance from the arcuate portion.

6. A fishing reel according to claim 4 wherein the drive means on the rotatable member comprise a shaped stud having circumferential walls, a channel through the stud, a track in the rotatable member, a pin at each drive means fast with the spool mounting shaft, margin defining means in the spool mounting shaft, the pins of the drive elements on the spool mounting shaft being in interabutting engagement with the track, the circumferential walls of the stud being in interabutting engagement at any one time with the margin defining means of one of the drive elements of the spool mounting shaft.

(References on following page)

References Cited

UNITED STATES PATENTS

| | | | |
|---|---|---|---|
| 2,775,417 | 12/1956 | Freund | 242—84.21 |
| 2,858,087 | 10/1958 | Giamimo et al. | 242—84.21 |
| 2,971,720 | 2/1961 | Wood | 242—84.21 |

FOREIGN PATENTS

| | | |
|---|---|---|
| 678,728 | 1/1964 | Canada. |
| 177,881 | 9/1935 | Switzerland. |

BILLY S. TAYLOR, *Primary Examiner.*